(12) United States Patent
Smith et al.

(10) Patent No.: US 7,123,285 B2
(45) Date of Patent: *Oct. 17, 2006

(54) TELECONFERENCING ROBOT WITH SWIVELING VIDEO MONITOR

(75) Inventors: Graham Thomas Smith, Toronto (CA); Deborah Ingrid Fels, Toronto (CA); Jutta Treviranus, Toronto (CA)

(73) Assignees: Telbotics Inc., Toronto (CA); Ryerson Polytechnic University and the University of Toronto, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/141,632

(22) Filed: May 31, 2005

(65) Prior Publication Data

US 2005/0219356 A1 Oct. 6, 2005

Related U.S. Application Data

(63) Continuation of application No. 09/423,414, filed as application No. PCT/CA98/00463 on May 6, 1998, now Pat. No. 6,914,622.

(60) Provisional application No. 60/045,793, filed on May 7, 1997.

(51) Int. Cl.
*H04N 7/14* (2006.01)

(52) U.S. Cl. .................. 348/14.05; 348/14.1; 348/169; 700/245

(58) Field of Classification Search ............. 348/14.01, 348/14.02, 14.03, 14.05, 14.07, 14.08, 14.09, 348/14.1, 14.16; 345/629, 660, 667; 715/733, 715/753; 705/2; 128/920; 709/203, 204; 700/13, 90, 245; 901/14, 19, 46
See application file for complete search history.

(56) References Cited

U.S. PATENT DOCUMENTS

| | | | | |
|---|---|---|---|---|
| 5,802,494 A | * | 9/1998 | Kuno | ............................ 705/2 |
| 5,808,663 A | * | 9/1998 | Okaya | ....................... 348/14.1 |
| 5,844,599 A | * | 12/1998 | Hildin | ....................... 348/14.1 |
| 6,914,622 B1 | * | 7/2005 | Smith et al. | ............. 348/14.05 |

* cited by examiner

*Primary Examiner*—Melur Ramakrishnaiah
(74) *Attorney, Agent, or Firm*—Weiner & Burt, P.C.; Irving M. Weiner; Pamela S. Burt

(57) ABSTRACT

A teleconferencing robot for enabling a remote conferee to project a sense of presence into a group meeting. The teleconferencing robot includes: a base; a video monitor movably mounted to the base for receiving and displaying an image of the remote conferee; an attention getting device for getting the attention of conferees in the group meeting; a control device mounted on the base for moving the video monitor and actuating the attention getting device in response to an input control signal derived from a remote signal generated by the remote conferee and sending an outgoing data signal to the remote conferee providing feedback to the remote conferee from the robot; and the video monitor and attention getting device move in response to the input control signal to enable the remote conferee to project a sense of presence into the group meeting, and to confirm the movement by the outgoing data signal.

20 Claims, 14 Drawing Sheets

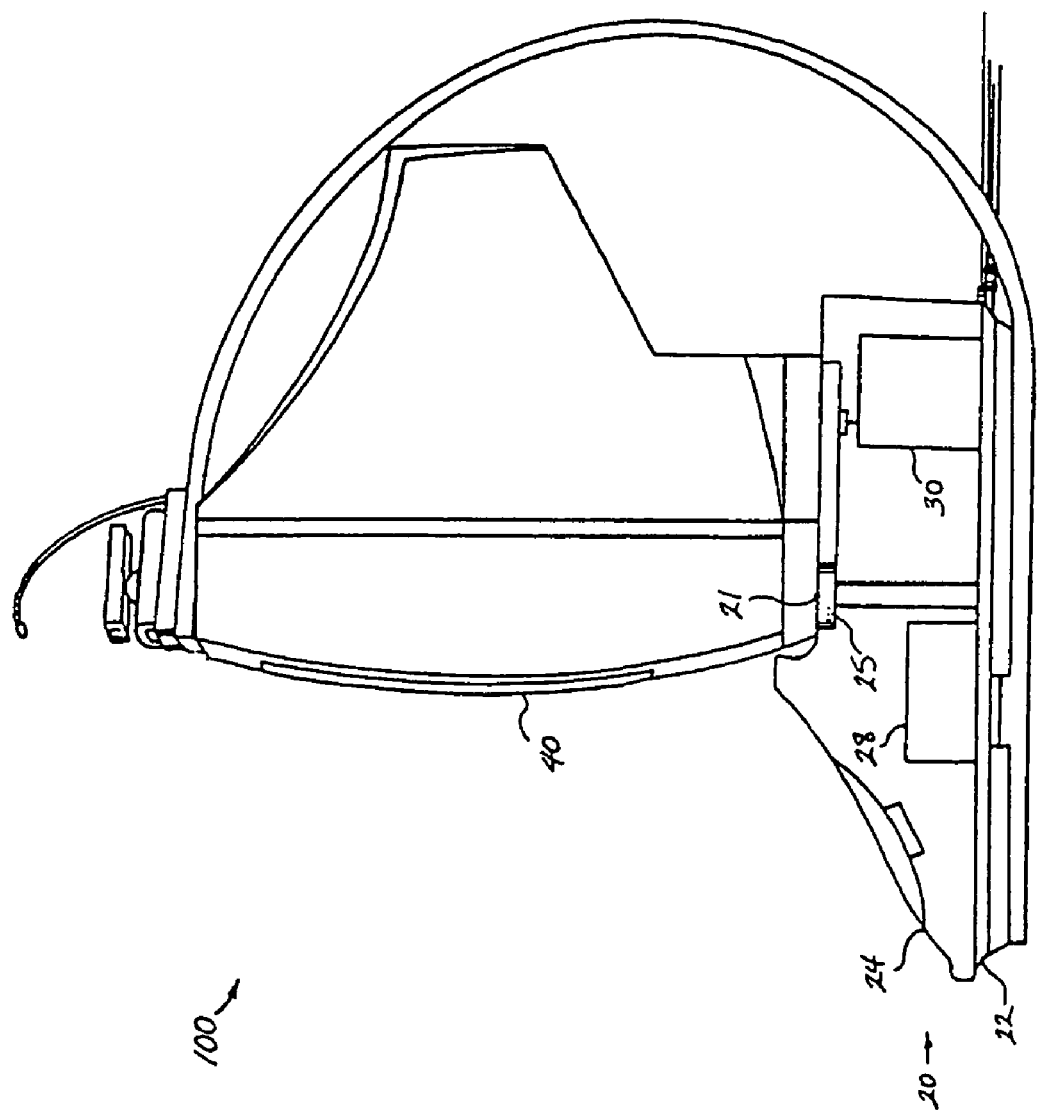

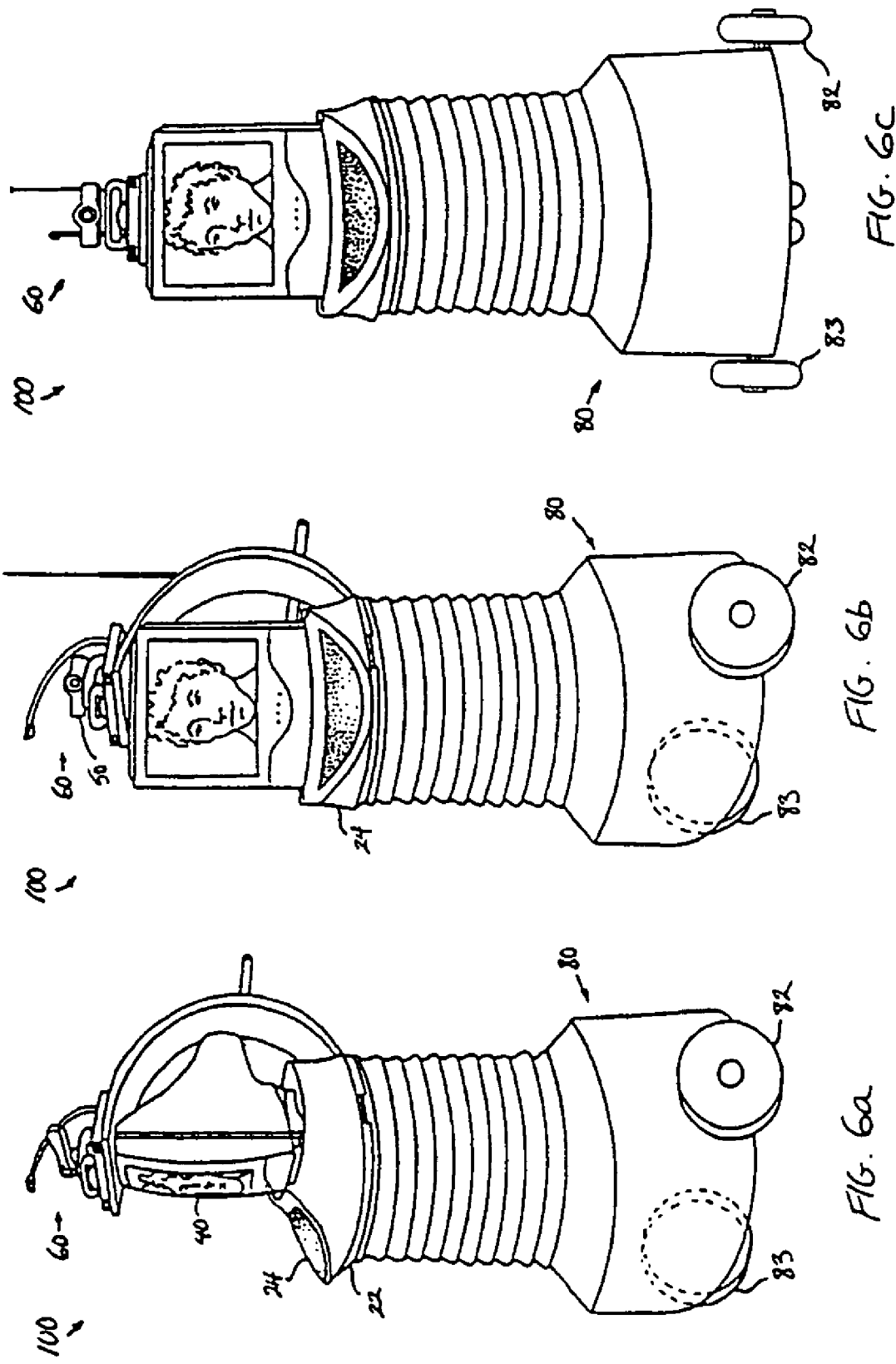

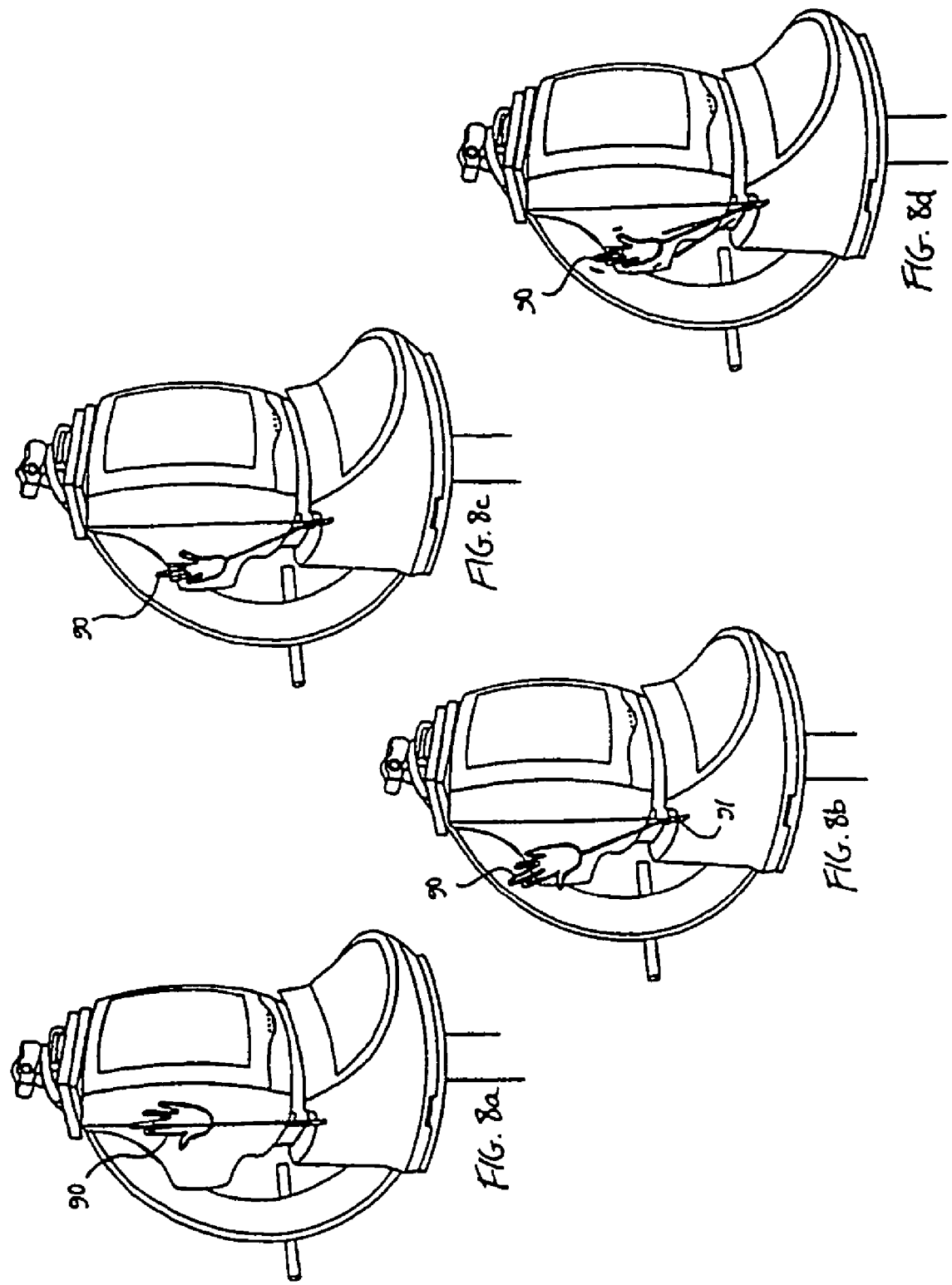

TELECONFERENCING ROBOT WITH SWIVELING VIDEO MONITOR

RELATED APPLICATION

This is a continuation of U.S. application Ser. No. 09/423,414, filed Dec. 23, 1999, now U.s. Pat. No. 6,914,622 entitled "Teleconferencing Robot with Swiveling Video Monitor", which is a 371 of PCT/CA98/00463, filed May 6, 1998 and claims the benefit of U.S. provisional application Ser. No. 60/045,793 filed May 7, 1997.

FIELD OF THE INVENTION

This invention relates to an apparatus for enabling a remote conferee to project his or her presence into a group meeting environment using a combination of videoconferencing/teleconferencing technology and robotics technology. Combining videoconferencing/teleconferencing elements with robotics elements helps create a sense that the remote conferee has a physical presence in the room which allows for more direct personal interaction in group meeting environments and social situations.

BACKGROUND OF THE INVENTION

Videoconferencing/teleconferencing is an effective form of communication which allows distant conferees the ability to see and hear each other over long distances. Unfortunately this technology is not being utilized as effectively as it could be due to the inherent nature of how people view television. When people view television they tend to sit passively and absorb information. This passive viewing behaviour is counter-productive when people utilize videoconferencing/teleconferencing where direct two-way non-passive interaction is required. Currently available videoconferencing/teleconferencing systems suffer from this drawback.

In conventional teleconferencing systems, it often appears as if the remote conferee is avoiding the viewer's eyes since the video camera capturing the image of the remote conferee is typically positioned above, below, or to one side of the video monitor which the remote conferee is viewing. There are proposals intended to enable a remote conferee to facilitate direct eye contact with the local conferees as described, for example, in U.S. Pat. No. 4,928,301, issued May 22, 1990; U.S. Pat. No. 5,117,285, issued May 26, 1992; U.S. Pat. No. 5,359,362, issued Oct. 25, 1994; and U.S. Pat. No. 5,400,069, issued Mar. 21, 1995. These proposals are intended to make the remote conferee appear as if he or she is gazing directly into the eyes of the viewer. This apparent direct eye contact can further add to the sense of personal contact and reinforce the remote conferee's sense of presence in the group meeting space. Many of these proposals are complex and to the applicant's knowledge they have not enjoyed significant success in the marketplace. Additionally the remote conferee's image, and the video camera which provide an image to the remote conferee are both essentially stationary, limiting the effective field of view for the remote conferee and his or her sense of participation in a conference.

SUMMARY OF THE INVENTION

To transform the television into a more dynamic interactive device a substantially life-sized image of a remote conferee's face is displayed on a television or video monitor and the television or video monitor is controlled to swivel left or right to create the impression that the remote conferee is turning his or her head to look at a person speaking. The swiveling video monitor may also be lifted up or lowered down to an appropriate height by a vertical lifting and lowering mechanism to mimic a standing or sitting position or achieve some height in between. The swiveling video monitor and the vertical lifting and lowering mechanism can further be coupled to a mobile ground unit to allow the remote conferee to move around the room in which the group meeting is taking place. The video monitor together with the vertical lifting and lowering mechanism may also mimic a bowing motion to be used as a form of greeting when appropriate. An attention-getting mechanism may also be incorporated so that the remote conferee may politely interrupt a conversation. For example, a mechanical representation of a raised and waving hand may be used for such a purpose. These physical movements shatter the mental construct that people have for what television is and allows them to think of television in a new way: the television is no longer simply a passive object but rather assumes a robotic presence, in essence becoming a part of what may be called a teleconferencing robot.

As already stated, preferably, the image of the remote conferee's face on the video monitor is substantially life-size. This gives people interacting with the teleconferencing robot a frame of reference that is based on conventional human dynamics (i.e. the size of the head) as opposed to a conventional teleconference where the head could appear either very small or large. The remote conferee can remotely control the teleconferencing robot to look left or right. Optionally, a sound location system built into the teleconferencing robot can be used to determine where the speaking person is positioned relative to the teleconferencing robot, and can be used to generate a control signal to automatically swivel the video monitor head left or right so that the remote conferee appears to be turning to look at the person speaking. This allows the remote conferee to concentrate on the social interaction, rather than on controlling the movement of the teleconferencing robot.

In accordance with the present invention, there is provided a teleconferencing robot, for enabling a remote conferee to project a sense of presence into a group meeting, the teleconferencing robot comprising: a base: a video monitor movably mounted to the base for receiving and displaying an image of the remote conferee: a video camera movably mounted on the base: control means mounted on the base for moving the video monitor and video camera in response to an input control signal: and wherein said video monitor and video camera move in response to said input control signal to enable a remote conferee to project a sense of presence into the group meeting.

In a further aspect of the present invention, there is provided a teleconferencing robot, for enabling a remote conferee to project a sense of presence into a group meeting, the teleconferencing robot comprising: a base; a video monitor movably mounted to the base for receiving and displaying an image of the remote conferee; attention getting means for getting the attention of conferees in the group meeting; control means mounted on the base for moving the video monitor and the attention getting means in response to an input control signal derived from a remote signal generated by the remote conferee and sending an outgoing data signal to the remote conferee providing feedback to the remote conferee from the teleconferencing robot; and wherein said video monitor and attention getting means move in response to said input control signal to enable the remote conferee to project a sense of presence into the group meeting, the remote conferee can confirm the movement by said outgoing data signal.

In accordance with another aspect, the present invention provides a teleconferencing robot in combination with a remote teleconferencing unit which comprises a second microphone and a second video camera for obtaining an audio signal and an image from the remote conferee for transmission to the video monitor of the teleconferencing robot, and a second video monitor and a second speaker for providing an image and an audio signal received from the teleconferencing robot, wherein the video monitor of the teleconferencing robot is provided with a speaker for outputting an audio signal received from the microphone of the remote teleconferencing unit; and wherein the input control signal is provided by the remote teleconferencing unit.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention and in which:

FIG. 3 is a side view of the teleconferencing robot with a cut-out view of the swivel base;

FIGS. 6a–6c are perspective views of the teleconferencing robot and mobile ground unit of FIG. 5 in operation;

FIG. 8a–8d are perspective views of the attention-getting mechanism in operation;

DETAILED DESCRIPTION OF THE PREFERRED EMBODIMENT

The preferred embodiment of the invention will now be described with reference to the figures.

Figure 1:
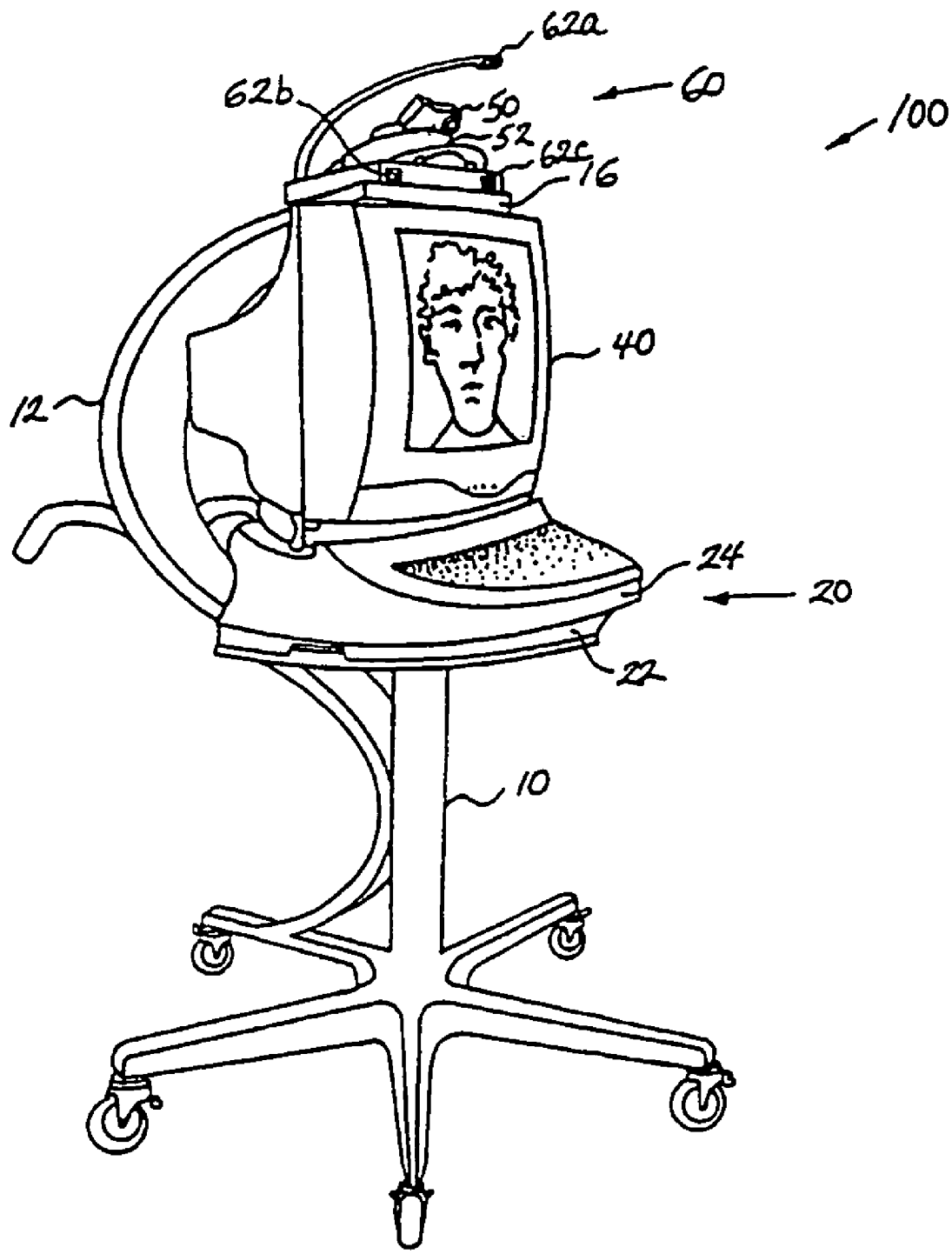
FIG. 1 is a perspective view of the teleconferencing robot on a rolling stand.

FIG. 1 shows a perspective view of a teleconferencing robot 100 placed on a rolling stand 10. The teleconferencing robot 100 has a swivel base 20 having a lower stage 22 secured to the stand and rotating upper stage 24 rotatable about a vertical axis with respect to lower stage 22. The rotating upper stage 24 has a defined forward direction. In the preferred embodiment of the invention, the top-front portion of rotating upper stage 24 is rounded and forwardly sloped to prevent loose items from being placed there. A video monitor 40 is placed on or fastened to the top-rear portion of the rotating upper stage 24. A supporting arm 12 extends from the lower stage 22 and supports a platform 16 positioned just above the video monitor 40. The platform 16 supports a speaker location system 60. One such system is commercially available from PictureTel Corporation of Andover, Mass., USA. The speaker location system includes a video camera 50 with a pan/tilt video camera base 52.

Microphones 62a, 62b and 62c pick up the sound coming from the person speaking and generate an appropriate control signal to control the pan/tilt video camera base 32 and the zoom on the video camera 50 so that the video camera 50 is directed at the person speaking. These functions are described in greater detail below with reference to FIGS. 9–11.

Figure 2C:
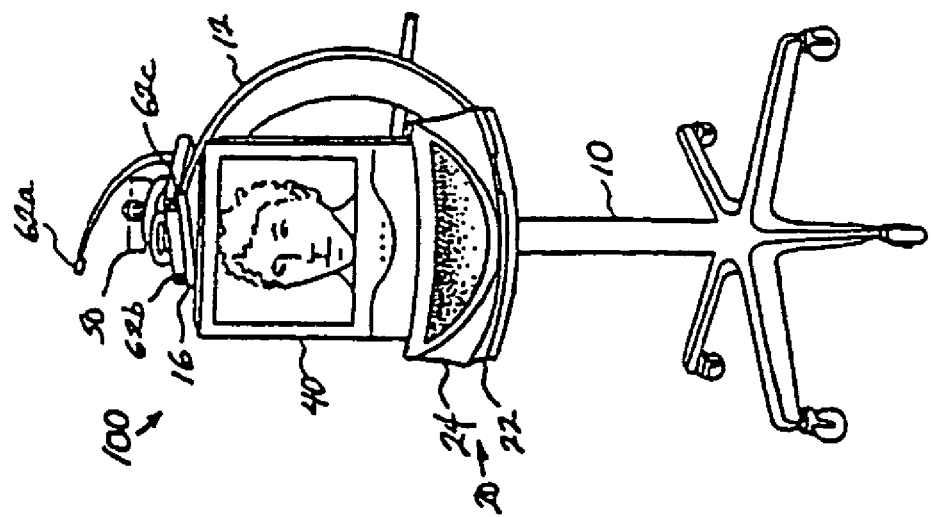
FIGS. 2a–2c are perspective views of the teleconferencing robot's swiveling feature in operation.
Figure 2B:
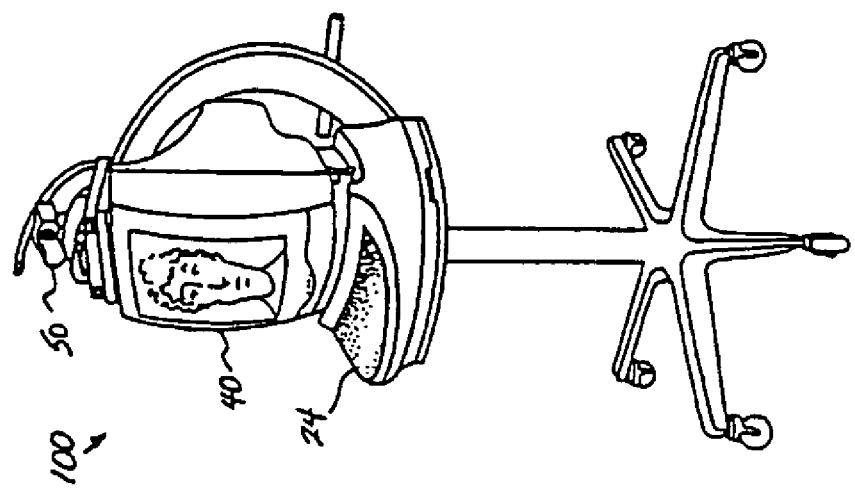
Figure 2A:
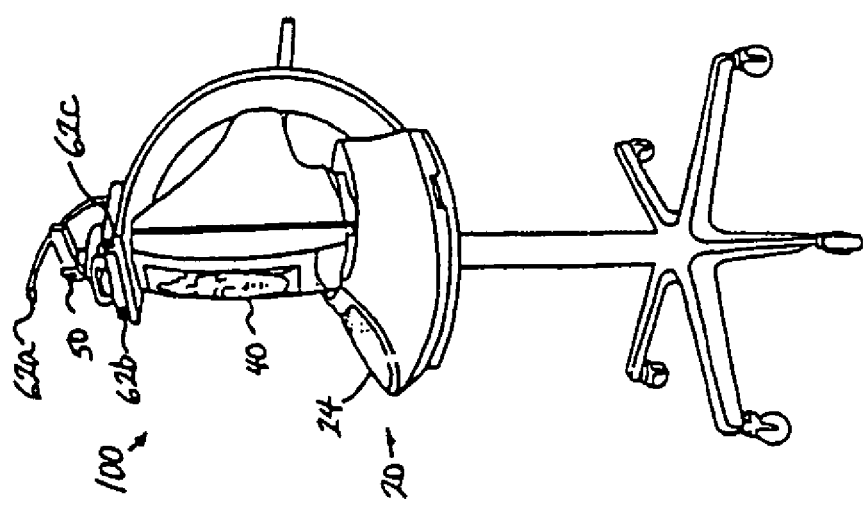

Now referring to FIGS. 2a–2c, the swiveling feature of the teleconferencing robot 100 is shown in a series of three perspective views. In the first view, FIG. 2a, the teleconferencing robot 100 is shown in a default starting position with video monitor 40, video camera 50 and microphones 62a, 62b and 62c substantially directed in the same forward direction as that defined by the forward direction of rotating upper stage 24 of swivel base 50. In FIG. 2b, in response to a control signal, the rotating upper stage 24 of the swivel base 20, the video monitor 40 and the video camera 50 have turned partially towards the viewer/speaker (viewer/speaker not shown but assumed to be in the same viewing position for all of FIGS. 2a–2c). This function will be explained later in greater detail with reference to FIGS. 9–13. In FIG. 2c, the rotating upper stage 24, video monitor 40, and video camera 50 have turned fully towards the viewer/speaker. During this turning operation, the rotating upper stage 24, video monitor 40, and video camera 50 are substantially synchronized to each other. The rolling stand 10, the supporting arm 12 the lower stage 12 of the swivel base 20, platform 16 and microphones 62a, 62b and 62c remain fixed in position during the swiveling operation illustrated in FIGS. 2a–2c.

FIG. 3 shows a side view of the teleconferencing robot 100 with a simplified cut-out view of swivel base 20. The rotating upper stage 24 and lower stage 22 are connected by a swiveling mechanism 25. Alternative coupling arrangements between the rotating upper stage 24 and lower stage 22 are possible. However, regardless or the coupling arrangement, a swivel point 21 is formed. The rotating upper stage 24 rotates about a vertical axis passing through the swivel point 21. The rotating upper stage 24 is engaged to a rotating upper stage drive unit 30, such as a servo-motor, which can swivel the rotating upper stage 24 about the vertical axis passing through the swivel point 21. A microcontroller 28 controls the rotating upper stage drive unit 30. A detailed description of this function is provided later with reference to FIGS. 9–11.

Still referring to FIG. 3, the screen of video monitor 40 is placed at or near the vertical axis passing through the swivel point 21 so that the screen of video monitor 40 may be viewed from a wider angle. If the screen of video monitor 40 is positioned too far forward, then the viewing angle will be significantly reduced for those conferees who are sitting to either side and close to the video monitor 40. In the present invention, the placement of the screen of video monitor 40 is such that two straight lines lying in a horizontal plane and crossing at the vertical axis passing through the swivel point 21, and touching the left and right edges of the screen of video monitor 40, respectively, form an angle of 160° to 200°.

Figure 4A:
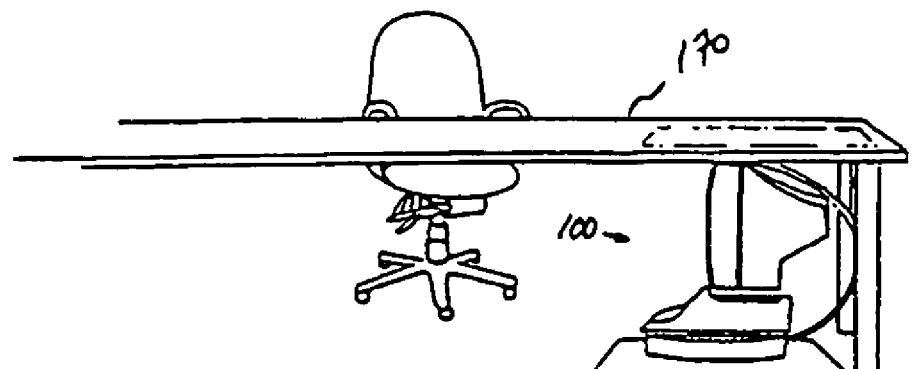
FIGS. 4a–4c are perspective views of the teleconferencing robot in various desk storage arrangements.
Figure 4B:
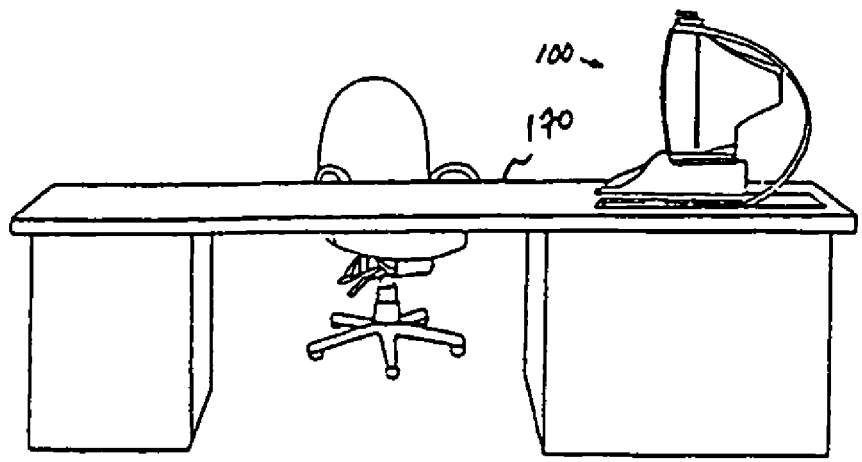
Figure 4C:
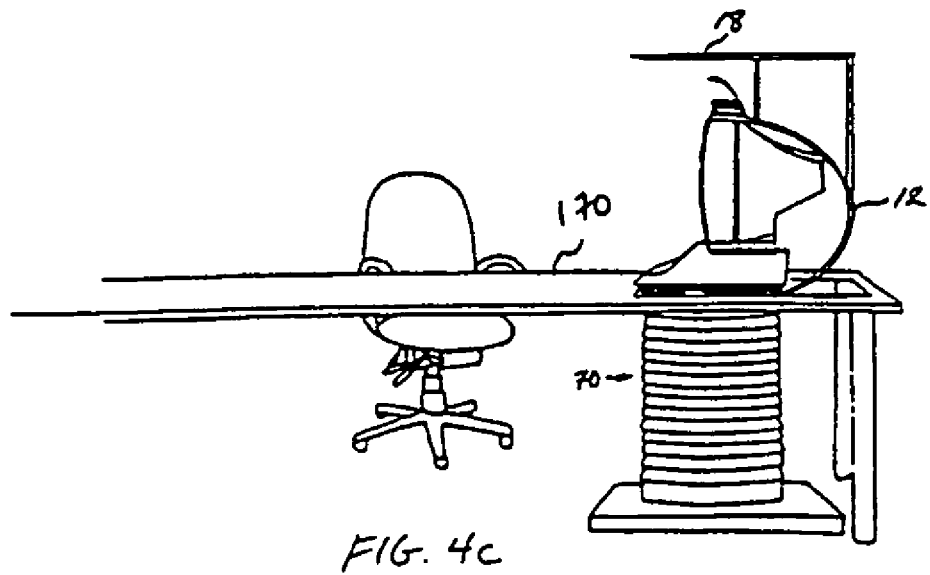

FIGS. 4a–4c show some desk storage arrangements for the teleconferencing robot 100 with a desk shown at 170. FIG. 4a shows one possible storage arrangement for the teleconferencing robot 100 where the teleconferencing robot is positioned under the desk 170. The desk is then provided with a removable panel to enable the robot 100 to be raised, in a manner described below, to a position flush with the top of the desk 170. FIG. 4b shows the teleconferencing robot 100 mounted in an operating position, on the desktop. FIG. 4c shows an alternative storage arrangement where the supporting arm 12 supports a removable desktop panel 18. A vertical lifting and lowering mechanism 70 raises the teleconferencing robot 100 raises into an operating position level with the desktop, and simultaneously displaces the panel 18 vertically upwards.

Figure 5:
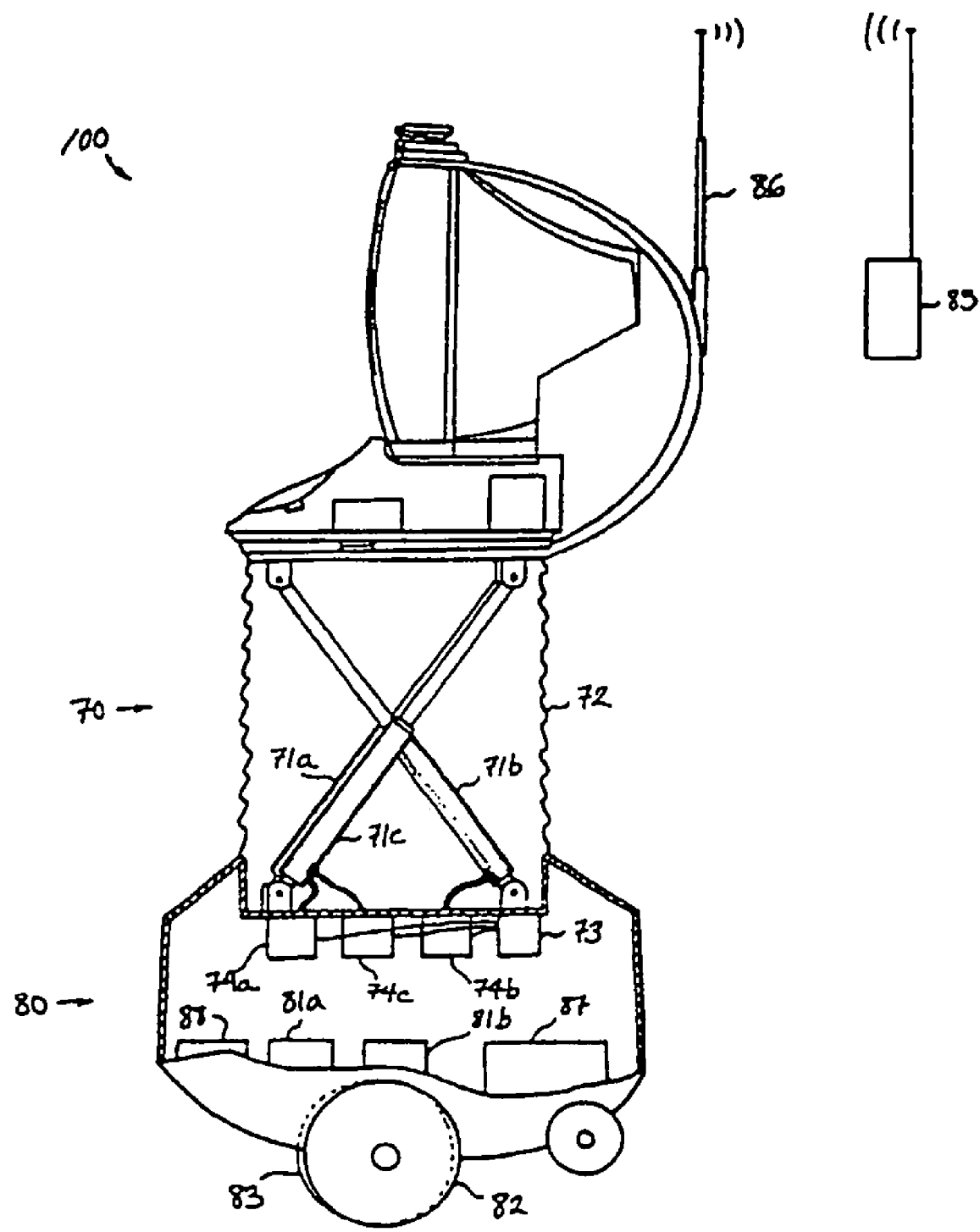
FIG. 5 is a simplified side cross-sectional view or the teleconferencing robot with vertical lifting and lowering mechanism and remote-controllable mobile ground unit.

FIG. 5 shows a simplified side cross-sectional view of a further embodiment of the teleconferencing robot 100 provided with the vertical lifting and lowering mechanism 70 and a mobile ground unit 80. The vertical lifting and lowering mechanism 70 comprises piston assemblies 71a, 71b and 71c which may be extended and retracted in concert to raise and lower the teleconferencing robot 100. The piston assemblies 71a, 71c are parallel and spaced apart, so that the three piston assemblies provide three point support. Piston assembly drive units 74a, 74b and 74c are operationally engaged to piston assemblies 71a, 71b and 71c, respectively. Vertical lifting and lowering control unit 73 controls the piston drive units 74a, 74b and 74c. The piston assemblies 71a, 71b and 71c are protected and hidden by a flexible accordion sleeve 72. A more detailed description of the operation of the vertical lifting and lowering mechanism is provided later, with particular reference to FIG. 12.

Still referring to FIG. 5, the mobile ground unit 80 houses a power source 87, drive motors 81a and 81b engaged to drive wheels 82 and 83, respectively, and a mobile ground unit control 88 to control the direction and speed of drive motors 81a and 81b. The mobile ground unit 80 is remotely controllable by using a remote control unit 89. Typically, instructions transmitted by a radio signal from the remote control unit 89 are received by an antenna 86 and relayed down to the mobile ground control unit 88. However, many other communication means are possible. A more detailed description of the operation of the mobile ground unit 80 is provided later with particular reference to FIG. 13.

FIGS. 6a–6c show the teleconferencing robot 100 and mobile ground unit 80 in operation. FIG. 6a shows the teleconferencing robot 100 and the mobile ground unit 80 in a default starting position, with rotating upper stage 24, lower stage 22, video monitor 40 and dynamic speaker locating system 60 all oriented in a defined forward direction. The forward path of mobile ground unit 80 (i.e. the direction of travel if both drive wheels 82 and 83 are engaged in the same direction at the same speed) is also oriented in the same defined forward direction. FIG. 6b shows the teleconferencing robot with the rotating upper stage 24 video monitor 40 and video camera 50 all rotated to face the viewer. When the remote conferee wishes to approach the viewer, in order to maintain eye contact, the mobile ground unit 80 turns toward the viewer while the rotating upper stage 24, video monitor 40 and video camera 50 simultaneously turn in the opposite direction at the same rate of rotation, i.e. so as to appear to remain stationary. The resulting position is shown in FIG. 6C. Consequently, the remote conferee can maintain "eye contact" with the viewer when turning the mobile ground unit 80 to approach the viewer. The details of this operation will be further described below with reference to FIGS. 9–13.

Figure 7C:
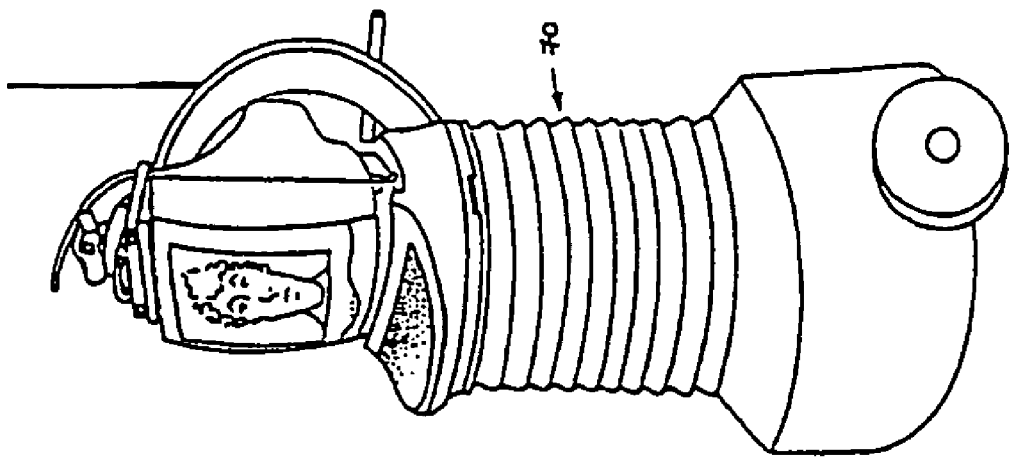
FIGS. 7a–7c are perspective views of the vertical lifting and lowering mechanism of FIG. 5 in operation.
Figure 7B:
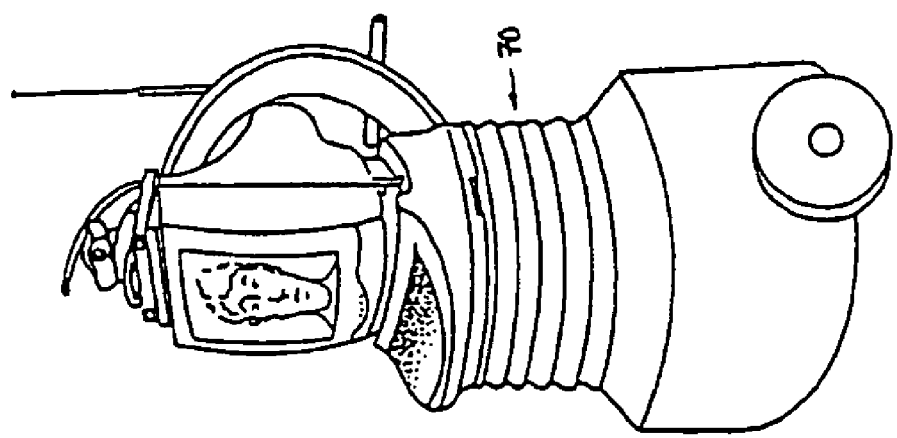
Figure 7A:
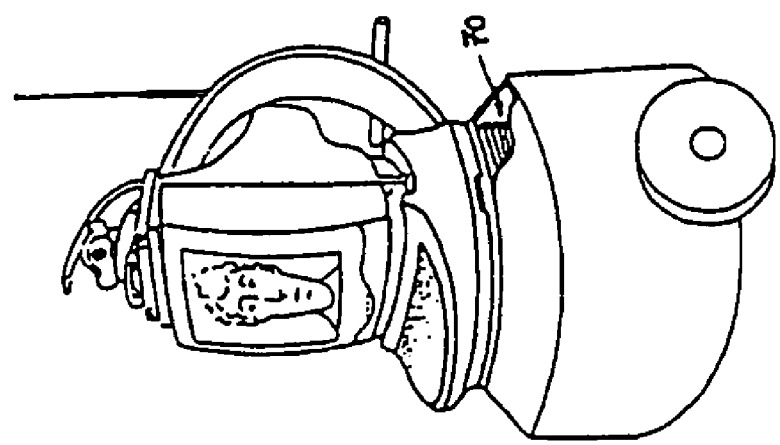

Next, referring to FIGS. 7a–7c, the vertical lifting and lowering mechanism 70 is shown in operation. FIG. 7a shows the vertical lifting and lowering mechanism 70 fully retracted. FIG. 7b shows the vertical lifting and lowering mechanism 70 in a partially raised position. FIG. 7c shows the vertical lifting and lowering mechanism 70 in a fully extended position. The height of the teleconferencing robot 100 when the vertical lifting and lowering mechanism 70 is fully extended represents approximately the height of a standing person. The vertical lifting and lowering mechanism 70 is adjustable to any height between the fully extended and fully retracted positions, shown in FIG. 7c and FIG. 7a respectively, so that an appropriate height can be established for a given situation. For example, when the teleconferencing robot 100 is positioned next to a conference table, the height might be appropriately adjusted to represent a sitting position. If the remote conferee or local conferee is a tall person, the vertical lifting and lowering mechanism 70 may be extended to reflect the remote conferee's height. Optionally, the remote conferee may want to match the height of the person to whom the remote conferee is speaking.

Now, referring to FIGS. 8a–8d, the operation of the attention-getting mechanism 90 is shown. FIG. 8a shows a representation of a hand and arm 90 in a standby position, laying against the side of video monitor 40. FIG. 8b shows the movement of the hand and arm 90 by rotation outwardly from the shoulder coupling point 91 so that it is then at an angle from the side of video monitor 40. FIG. 8c shows a further action of hand and arm 90 where it is rotated through a 90° angle about an axis along the arm thereof such that the hand appears to be in a "palm-open" position in relation to the viewer. FIG. 8d shows the representation of a hand and arm 90 in the palm-open position being rotated alternately outwardly and inwardly to mimic a waving motion. Such a motion may be easily achieved, for example, by using motors and mechanisms similar to that used for automobile windshield wipers.

Figure 9:
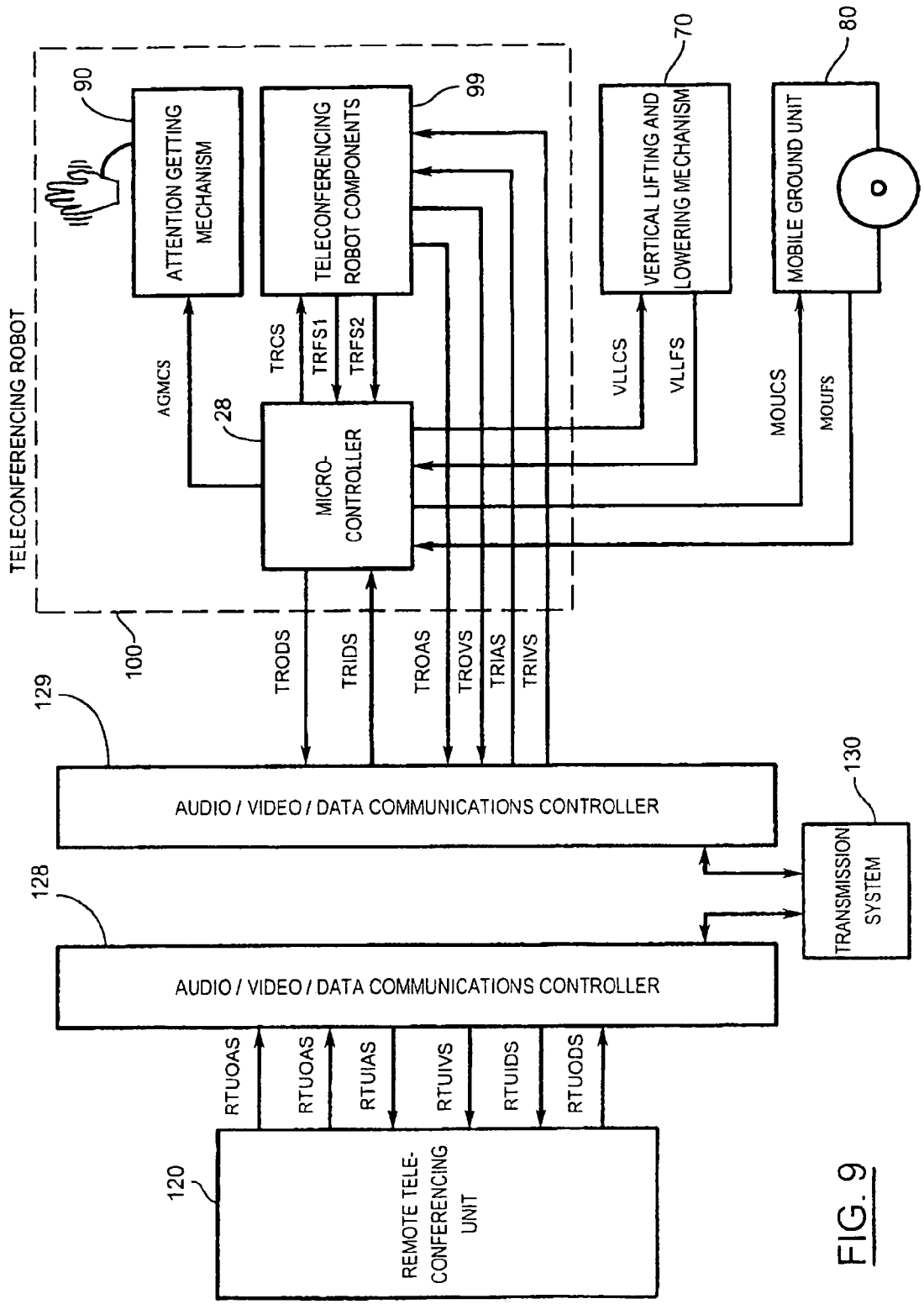
FIG. 9 is a schematic block diagram showing the link between the remote teleconferencing unit at the remote conferee's site and the teleconferencing robot at the local group meeting site.

FIG. 9 is a simplified block diagram showing the interconnection between the remote teleconferencing unit 120, located at the remote conferee's site, and the teleconferencing robot 100, located at the local group meeting site. Audio/video/data communications controllers 128 and 129 receive and transmit a plurality of audio-, video- and data-signals between the remote teleconferencing unit 120 and the teleconferencing robot 100 via a transmission system 130, which can be any suitable transmission system, including known telephone lines, wireless transmission, etc. The plurality of signals shown in FIG. 9 are explained in greater detail below. The teleconferencing robot 100 includes the micro-controller 28 which controls the attention getting mechanism 90 as well as various other teleconferencing robot components represented by block 99. The micro-controller 28 also controls the vertical lifting and lowering mechanism 70 and mobile ground unit 80 when provided, both of these units being optional.

Figure 10:
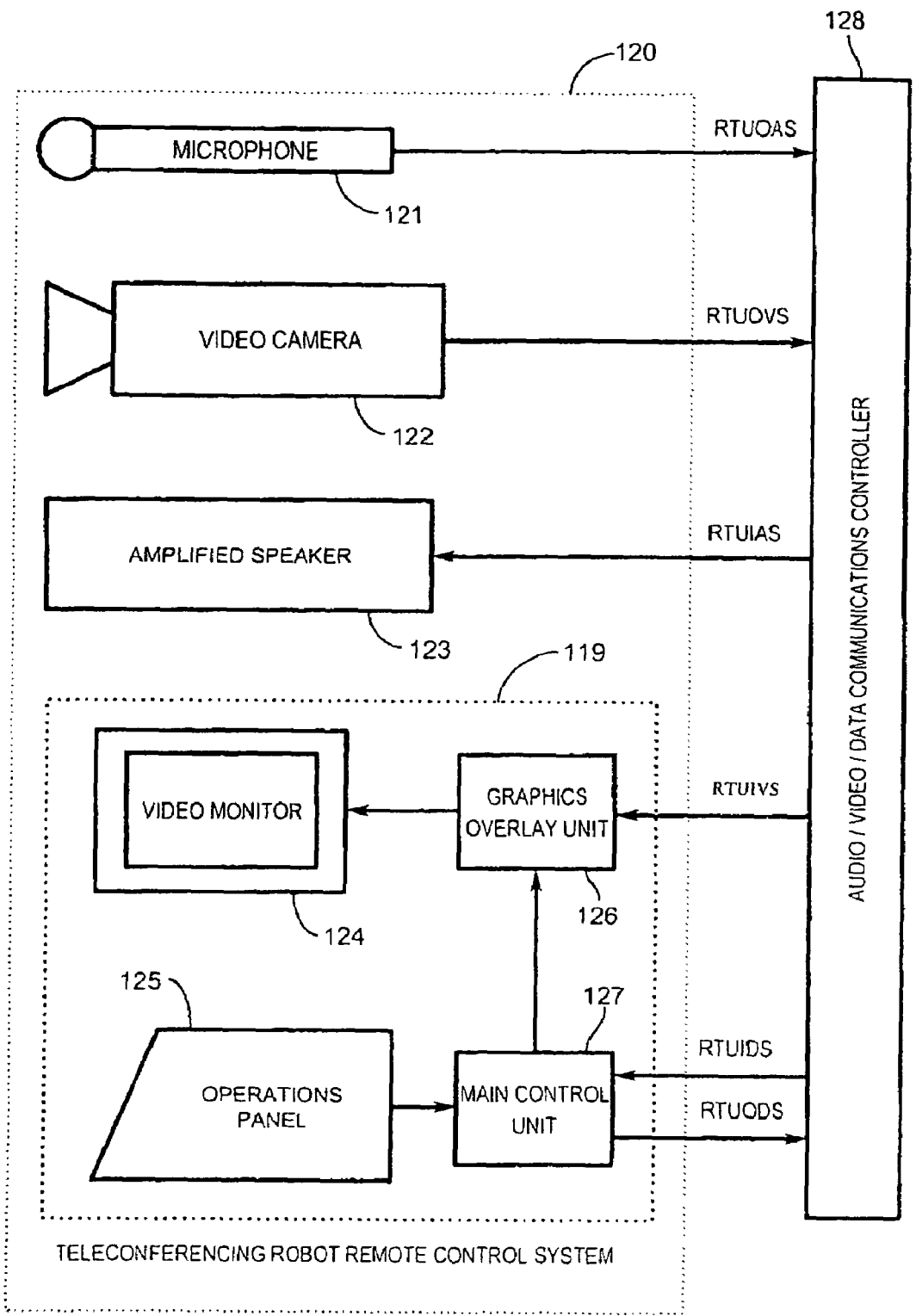
FIG. 10 is a schematic block diagram of the remote teleconferencing unit at the remote conferee's site.

Now referring to FIG. 10, the schematic layout of remote teleconferencing unit 120 is shown. Remote teleconferencing unit 120 ("RTU 120") includes a microphone 121 to pick up the voice of the remote conferee and send a RTU outgoing audio signal ("RTUOAS") to audio/video/data communications controller 128 ("AVDCC 128"). The AVDCC 128 controls the transmission and reception of all of the various RTU signals to and from an equivalent communications controller, AVDCC 129 (shown in FIG. 9), located at the local group meeting site.

RTU 120 further includes a video camera 122 to capture an image of the remote conferee. The video camera 122 sends an RTU outgoing video signal ("RTUOVS") to AVDCC 128. Amplified speaker 123 receives an RTU incoming audio signal ("RTUIAS") from AVDCC 128. The RTUIAS originates from the teleconferencing robot 100 (shown in FIG. 9) and typically consists of the voices of the local conferees at the group meeting site.

RTU 120 further includes a teleconferencing robot remote control system 119 which remotely controls the operation of the teleconferencing robot 100 of FIG. 9. The teleconferencing robot remote control system 119 comprises a video monitor 124, an operations panel 125, a graphics overlay unit 126 and a main control unit 127. The remote conferee controls the teleconferencing robot 100 of FIG. 9 by means of input at the operations panel 125. Operations panel 125 may be a keyboard, joystick, mouse or any other input device or a combination thereof. The main control unit 127 receives the input from operations panel 125 and sends out an RTU outgoing data signal ("RTUODS") to AVDCC 128 and eventually to micro-controller 28 of FIG. 9.

The RTUODS contains instructions and control signals to control the various functions of the teleconferencing robot 100 of FIG. 9. The main control unit 127 also provides feedback to the remote conferee by means of graphics overlay unit 126 which may display various characters, symbols and icons on video monitor 124. An RTU incoming video signal ("RTUIVS") originating from the teleconferencing robot 100 of FIG. 9 is received by the graphics overlay unit 126 and is passed through to video monitor 124, either with or without any characters, symbols and icons superimposed on the video image created by the RTUIVS on video monitor 124.

The main control unit 127 further receives an RTU incoming data signal ("RTUIDS") which contains at least one of a plurality of feedback signals from the teleconferencing robot 100, the vertical lifting and lowering mechanism 70 ("VLLFS") and the mobile ground unit 80 ("MOUFS"), all shown in FIG. 9. Some of the feedback contained in the RTUIDS may be represented graphically to the remote conferee via the graphics overlay unit 126 and video monitor 124. For example, a graphic may show the current rotational position of the rotating upper stage 24 of FIGS. 2*a*–2*c* so that the remote conferee is aware of any limitations of turning further left or further right.

Figure 11:
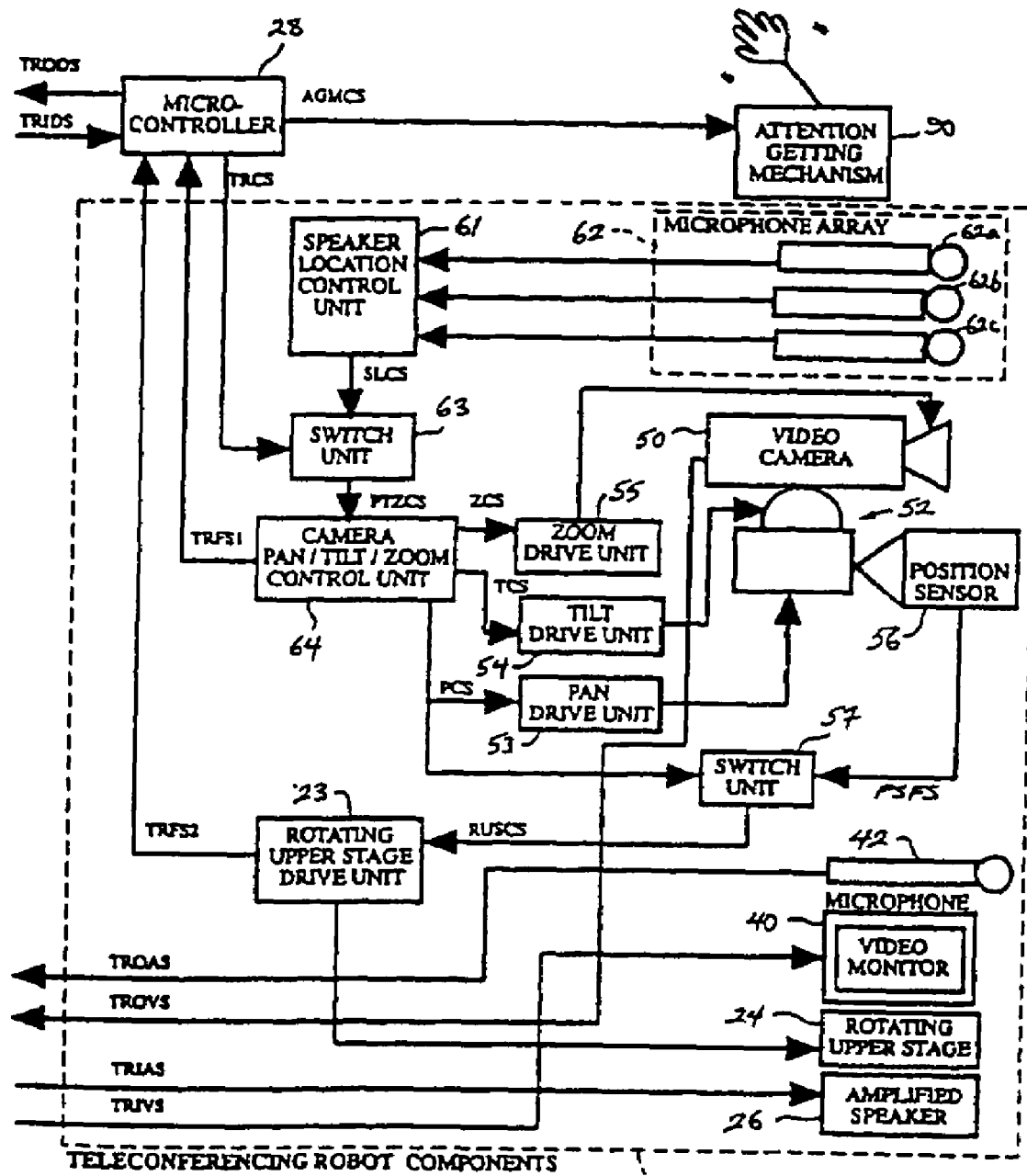
FIG. 11 is a schematic block diagram of the teleconferencing robot at the local group meeting site.

Now referring to FIG. 11, the teleconferencing robot components 99 of FIG. 9 are shown in greater schematic detail. The micro-controller 28 controls the operation of various components based on control instructions received from the main control unit 127 shown in FIG. 9. These control instructions contained in the RTUODS are transmitted by the AVDCC 128 through the transmission system 130 and to the AVDCC 129, all shown on FIG. 9. The AVDCC 129 of FIG. 9 transmits the same control instructions to the micro-controller 28 as the teleconferencing robot incoming data signal ("TRIDS") as shown in FIG. 11. The micro-controller 28 also provides feedback to the main control unit 127 of FIG. 10 by means of the teleconferencing robot outgoing data signal ("TRODS") which is transmitted to the AVDCC 129 of FIG. 10.

The micro-controller 28 activates the attention-getting mechanism 90 upon receiving an instruction from the remote conferee via the operations panel 125 shown in FIG. 10. Activation causes the attention-getting mechanism to rotate the representation of the hand and arm outwards, twist the hand 90° into a "palm-open" position, then start a waving motion back and forth, as illustrated in FIGS. 8*a*–8*d*, above. The required motion may be obtained quite easily, for example, by using mechanisms and motors similar to that used for automobile windshield wipers.

The swivelling feature of the teleconferencing robot 100, as illustrated in FIGS. 2*a*–2*c*, can be either automatic or manually controlled by the remote conferee. A switch unit 63 receives a speaker location control signal ("SLCS") to control the zoom function of the video camera 50 and control the pan/tilt video camera base 52. The switch unit 63 also receives a teleconferencing robot control signal ("TRCS") from the micro-controller 28. The remote conferee can cause the switch unit 63 to switch between automatic mode, where the SLCS is used, and manual mode, where the remote conferee provides the pan, tilt and zoom signals.

In automatic mode, the speaker location control unit 61 receives input signals from a microphone array 62 comprising three microphones 62*a*, 62*b* and 62*c*, as shown in FIG. 1. Using the signals from the microphone array 62, the speaker location control unit 61 determines from which direction the sound is coming from. The speaker location control unit 61 then produces the SLCS to control the zoom function of video camera 50 and control the pan/tilt video camera base 52.

For manual mode, the remote conferee first sends a switch signal to switch unit 63 to enter the manual mode. Then the remote conferee provides pan, tilt and zoom control signals via the operations panel 125, shown in FIG. 10. The remote conferee can switch back to automatic mode by sending another switch signal to switch unit 63.

In either automatic or manual mode, the switch unit 63 sends on a pan/tilt/zoom control signal ("PTZCS") to the camera pan/tilt/zoom control unit 64. The camera pan/tilt/zoom control unit 64 controls pan drive unit 53, tilt drive unit 54 and zoom drive unit 55 to drive the pan/tilt video camera base 52 and the zoom on video camera 50. The camera pan/tilt/zoom control unit 64 also provides a teleconferencing robot feedback signal 1 ("TRFS1") to the micro-controller 28 to communicate to the main control unit 127 of FIG. 10 the camera pan/tilt/zoom control information.

The pan control signal ("PCS") from the camera pan/tilt/zoom control unit 64 to the pan drive unit 53 is split and is also provided as an input to switch unit 57. An optional position sensor 56 is positioned to read the position and rotation of the pan base of pan/tilt video camera base 52. The position sensor 56 provides a position sensor feedback signal ("PSFS") which is compatible with the PCS signal and which provides essentially the same pan position and rotation information. The position sensor 56 may be any number of devices which senses the panning movement of the pan/tilt video camera base 52. Two such devices are shown in FIGS. 11*a* and 11*b*, operationally coupled to the pan/tilt video camera bases 52*a* and 52*b*, respectively.

Figure 11B:
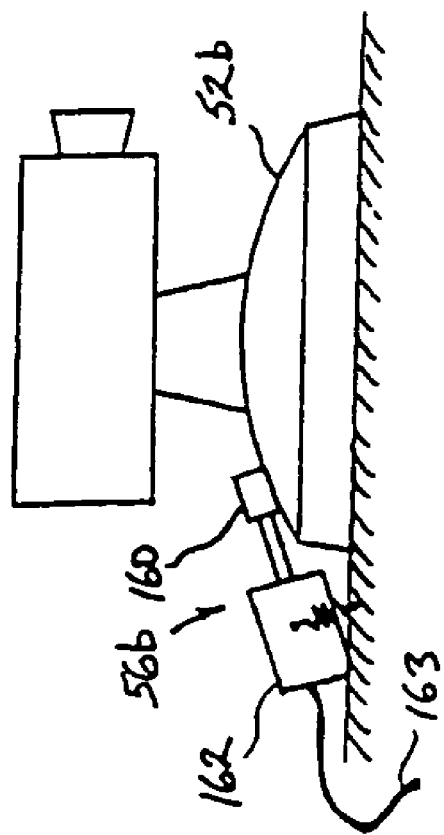
FIG. 11b is a side view of another embodiment of a position sensor shown in FIG. 11.
Figure 11A:
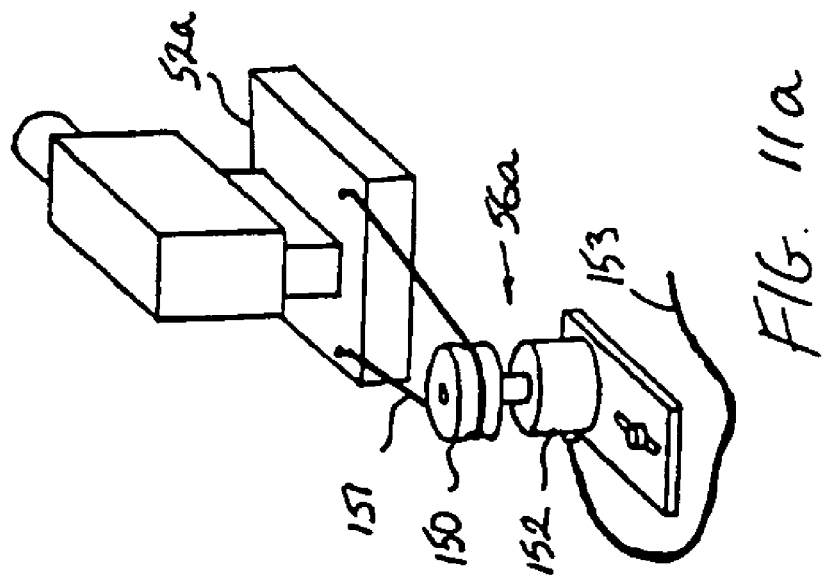
FIG. 11a is a perspective view of one embodiment of a position sensor shown in FIG. 11.

FIG. 11*a* shows a perspective view of one embodiment of a position sensor 56*a* with a shaft head 150 mechanically engaged to the pan/tilt video camera base 52*a* by a wire 151 set at an appropriate tension to cause the shaft head 150 to rotate as the pan/tilt video camera base 52*a* pans left and right. A base 152 of the position sensor 56*a* generates a signal corresponding to the rotation of the shaft head 150 and the signal is transmitted via a communication link 153 to the switch unit 57 of FIG. 10.

FIG. 11b shows a side view of another embodiment of a position sensor 56b with a shaft head 160 frictionally engaged to a spherical, dome shaped top of a pan/tilt video camera base 52b. The rotation of the pan/tilt video camera base 52b causes the shaft head 160 to rotate. A base 162 of the position sensor 56b generates a signal corresponding to the rotation of the shaft head 160 and the signal is transmitted via a communication link 163 to switch unit 57 of FIG. 11.

In addition to the above two mechanisms, numerous other, mechanical and non-mechanical means of sensing the rotation of the pan/tilt video camera base 52 are available.

The switch unit 57 can be manually set to pass on either the PCS signal or the PSFS signal from the optical position sensor 56. The switch unit 57 passes on the selected signal as a rotating upper stage control signal ("RUSCS") to the rotating upper stage drive unit 23. The rotating upper stage drive unit receives the RUSCS and drives the rotating upper stage 24 left or right. Since the RUSCS is either the PCS or the PSFS, both of which provide information on the video camera 50 pan position, the rotating upper stage 24 is essentially driven to the same pan position as the video camera 50. The rotating upper stage drive unit 23 provides a teleconferencing robot feedback signal 2 ("TRFS2") to the micro-controller 28 so that the remote conferee is aware of the position of the rotating upper stage 24.

Still referring to FIG. 11, the video monitor 40 displays a substantially life-sized image of the remote conferee's face on the screen. This image is received as the teleconferencing robot incoming video signal ("TRIVS") from the AVDCC 129, shown in FIG. 9. The TRIVS corresponds to the RTUOVS shown in FIG. 10. Video monitor 40 is placed on or fastened to the rotating upper stage 24, as shown in FIG. 1. Thus, the video monitor 40 is rotating with the rotating upper stage 24 and is essentially synchronized to the pan position and rotation of the video camera 50.

The video camera 50 provides and image of the local conferee, typically the local conferee that is speaking, and sends a teleconferencing robot outgoing video signal ("TROVS") to the AVDCC 129 of FIG. 9. The TROVS corresponds to the RTUIVS of FIG. 10.

Microphone 42 picks up the sound from the local conferees and sends a teleconferencing robot outgoing audio signal ("TROAS") to the AVDCC 129. Optionally, if the automatic speaker location system is being used, the sound picked up by the microphone array 62 may be supplied as the TROAS (this optional configuration is not shown in FIG. 11). The TROAS corresponds to the RTUIAS of FIG. 10.

The amplified speaker 26 receives a teleconferencing robot incoming video signal ("TRIAS") from the AVDCC 129, shown in FIG. 9. The TRIAS corresponds to the RTUOAS of FIG. 10 and provides the local conferees with sound from the remote conferee.

Figure 12:
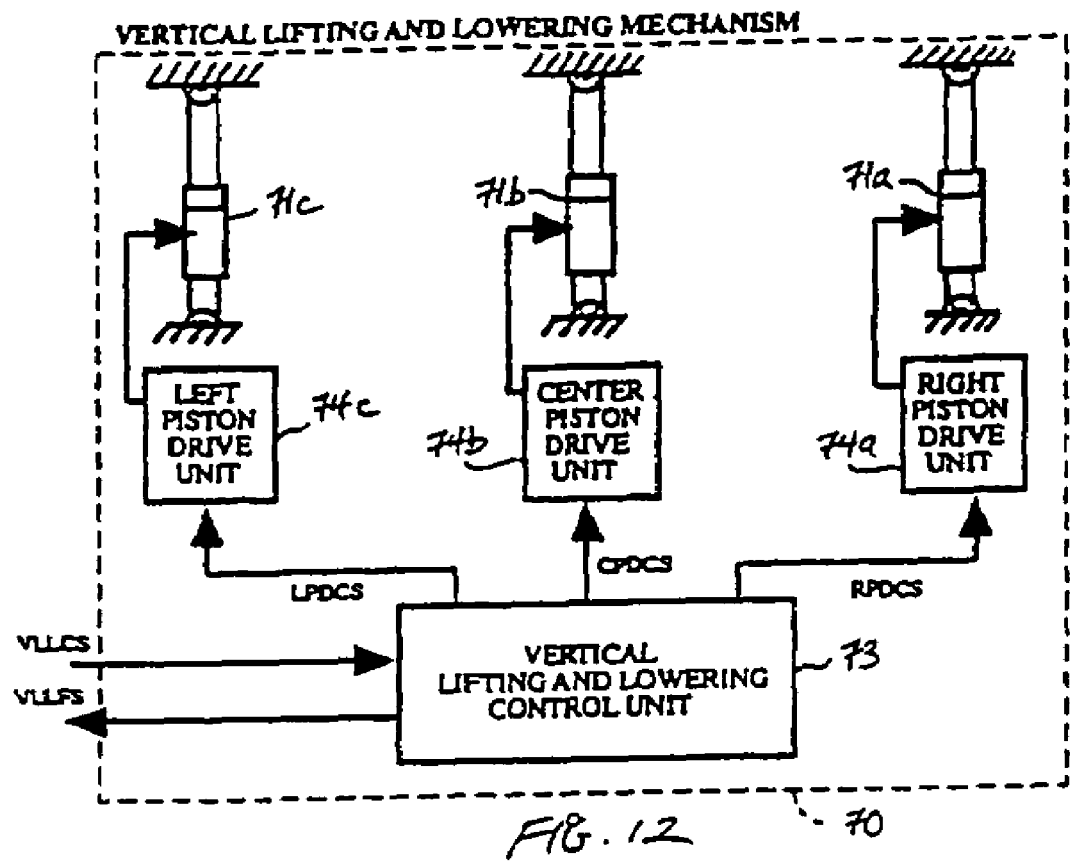
FIG. 12 is a schematic block diagram of the vertical lifting and lowering mechanism.

Now referring to FIG. 12, a schematic of the vertical lifting and lowering mechanism 70 ("VLLM 70") is shown. The VLLM 70 comprises piston assemblies 71a, 71b and 71c which are positioned in an arrangement as shown in FIG. 5. Piston assembly drive units 74a, 74b and 74c drive the piston assemblies 71a, 71b and 71c respectively. The piston assembly drive units 74a, 74b and 74c are controlled by the vertical lifting and lowering control unit 73 ("VLLCU 73"). The VLLCU 73 receives a vertical lifting and lowering control signal ("VLLCS") from the micro-controller 28 of FIG. 9. The VLLCU 73 also provides a vertical lifting and lowering feedback signal ("VLLFS") to the micro-controller 28 of FIG. 9 so that the remote conferee receives feedback as to the state of the VLLM 70.

In order to raise the teleconferencing unit 100, as illustrated in FIGS. 7a–7c, the piston assemblies 71a, 71b and 71c are extended in concert at the same rate, starting from a fully retracted position as shown in FIG. 7a. In FIG. 7c, the piston assembles 71a, 71b and 71c (hidden inside the flexible accordion sleeve 72) are fully extended. To lower the teleconferencing unit 100, the piston assemblies 71a, 71b and 71c are retracted at the same rate. By controlling the amount of extension of piston assemblies 71a, 71b and 71c, the teleconferencing robot 100 can be set at a height anywhere between a fully retracted and fully extended position.

Referring back to FIG. 5, in order to mimic bowing, the center piston assembly 71b can be extended less than the outer piston assembles 71a and 71c. This will cause the teleconferencing robot 100 to tilt forward and assume a bowing position. Extension of the center piston assembly 71c back to the same extension of the outer piston assemblies 71a and 71c will cause the teleconferencing robot to return to an up-right position.

Figure 13:
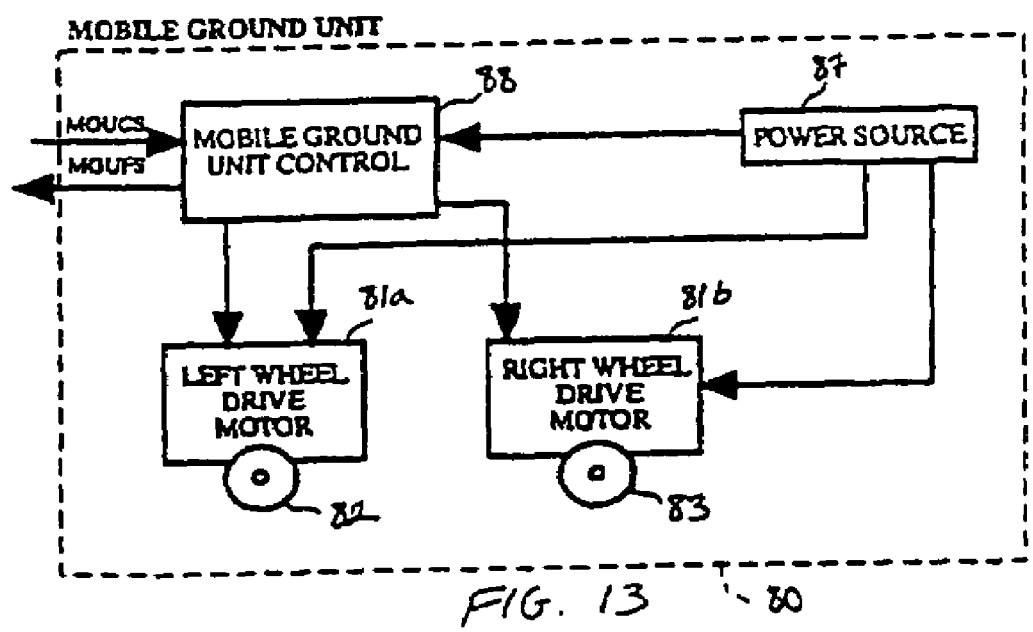
FIG. 13 is a schematic block diagram of the mobile ground unit.

Now referring to FIG. 13, a schematic diagram of the mobile ground unit 80 ("MGU 80") is shown. A power source 87 provides power to MGU control 88 and the wheel drive motors 81a and 81b. The MGU control 88 receives an MGU control signal ("MGUCS") from the micro-controller 28, as shown in FIG. 9. The MGU control 88 provides a MGU feedback signal ("MGUFS") back to the micro-controller 28 to provide feedback about the MGU to the remote conferee.

The MGUCS contains control information to operate the rotation speed and direction of rotation of the drive wheels 82 and 83. In order to move forward, the left wheel drive motor 81a and the right wheel drive motor 81b turn the drive wheels 82 and 83 in a forward direction at the same rate. Reversing the direction causes the MGU 80 to move backwards, but this will typically not be used since the remote conferee requires visual feedback from the video camera 50, as shown in FIGS. 6a–6c, in order to operate the MGU 80.

To turn right, the right wheel drive motor 81b will hold the right drive wheel 83 stationary while the left wheel drive motor 81a drives the left drive wheel in a forward direction. To make a wider right turn, in known manner, the right wheel drive motor 81b can drive the right drive wheel 83 at a slower rate than the left wheel drive motor 81a is driving the left drive wheel 82. To turn right while staying in position, the right wheel drive motor 81b can drive the right drive wheel 83 in a reverse direction at the same rate as the left wheel drive motor 81a drives the left drive wheel 82 in a forward direction. Left turns can be made in an analogous fashion with the wheels and directions reversed.

In order to perform the manoeuvre shown in FIGS. 6a–6c, the teleconferencing robot 100 is operated as described above so that the video monitor 40 is directed towards the viewer. To turn the MGU 80 towards the viewer, in preparation for moving towards the viewer, the MGU 80 is operated to turn left while staying in position. In order to achieve this, referring back to FIG. 11, the rotating upper stage drive unit 23 provides a feedback signal, TRFS2, to the micro-controller 28. Using the TRFS2, the micro-controller 28 then calculates the amount of rotation required by the MGU 80 to rotate into position. The micro-controller 28 then sends appropriate control signals TRCS and MGUCS (shown in FIG. 9) so that the MGU 80 is rotating in position towards the viewer and the rotating upper stage 24 and the video camera 50 are rotating at the same rate of rotation but in the opposite direction.

Figure 14A:
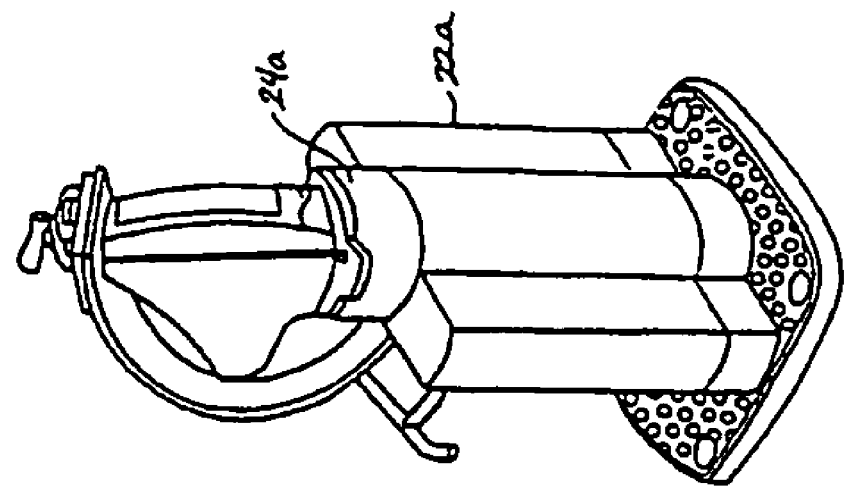
FIGS. 14a–14c are perspective views of an alternative design of the teleconferencing robot.
Figure 14B:
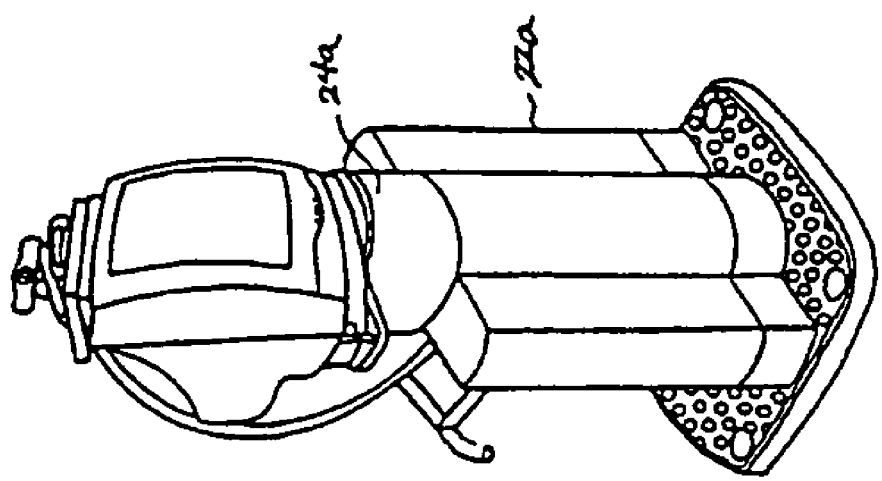
Figure 14C:
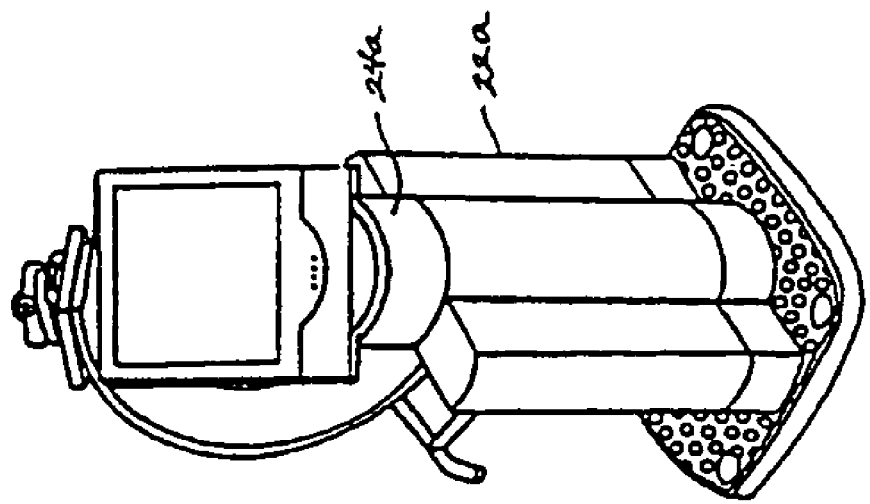

It will be appreciated that, while the preferred embodiment of the invention has been described, there are numerous variations possible within the scope of the present invention. For example, rather than having a swivel base, a ceiling mounted swivel mechanism may be used to support a hanging video monitor. In such a case, the video camera and speaker location unit may be fastened to a platform hanging beneath the video monitor. Furthermore, a vertical lifting and lowering mechanism may be mounted from the ceiling to raise and lower a video monitor from the ceiling. In addition, many different designs and configurations possible. For example, in FIGS. 14a–14c, the rotating upper stage 24 and lower stage 22 of FIG. 1 are replaced by rotating upper stage 24a and lower stage 22a.

The embodiments of the invention in which an exclusive property or privilege is claimed are defined as follows:

1. A teleconferencing robot, for enabling a remote conferee to project a sense of presence into a group meeting, the teleconferencing robot comprising:
   a base;
   a video monitor movably mounted to the base for receiving and displaying an image of the remote conferee;
   attention getting means for getting the attention of conferees in the group meeting;
   control means mounted on the base for moving the video monitor and actuating the attention getting means in response to an input control signal derived from a remote signal generated by the remote conferee and sending an outgoing data signal to the remote conferee providing feedback to the remote conferee from the teleconferencing robot; and
   wherein said video monitor and attention getting means move in response to said input control signal to enable the remote conferee to project a sense of presence into the group meeting, the remote conferee can confirm the movement by said outgoing data signal.

2. A teleconferencing robot as claimed in claim 1, wherein the video monitor is rotatably mounted to the base unit, for rotation about a substantially vertical axis; and
   wherein the control means includes a rotating drive unit for rotation of the video monitor.

3. A teleconferencing robot as claimed in claim 2, further comprising a video camera rotatably mounted with the video monitor to the base unit; and
   wherein the rotating drive unit rotates the video monitor and video camera.

4. A teleconferencing robot as claimed in claim 3, wherein the video camera is rotatably mounted to the base, for rotation about a substantially vertical axis;
   wherein the control means includes a pan drive unit for rotation of the video camera; wherein the video camera is additionally mounted so as to be tiltable upwards and downwards; and
   wherein the control means includes a tilt drive unit for tilting the video camera upwards and downwards; and
   wherein the outgoing data signal contains at least one feedback signal indicative of pan/tilt/zoom information of the video camera.

5. A teleconferencing robot as claimed in claim 1 wherein outgoing data signal contains at least one feedback signal indicative of a position of the video monitor.

6. A teleconferencing robot as claimed in claim 1, wherein the outgoing data signal is indicative of actuating the attention getting means.

7. A teleconferencing robot as claimed in claim 1, wherein the base comprises upper and lower stages, wherein the video monitor is secured to the upper stage, and the lower and upper stages are rotatable relative to one another about a substantially vertical axis; and
   wherein the upper stage has a defined forward direction with the video monitor normally being directed in said defined forward direction.

8. A teleconferencing robot as claimed in claim 3, wherein the base comprises an upper part on which the video monitor is mounted and a lower part, and means for vertically displacing the upper and lower parts relative to one another.

9. A teleconferencing robot as claimed in claim 3, wherein the base comprises an upper part on which the video monitor is mounted and a lower part; and
   wherein the lower part of the base comprises a mobile ground unit including wheels and drive motors for rotating the wheels, to drive the teleconferencing robot across the ground.

10. A teleconferencing robot as claimed in claim 3, wherein the screen of the video monitor is positioned at or near the vertical axis about which the video monitor rotates such that the angle formed by two straight lines lying in a horizontal plane crossing at the vertical axis and further extending through left and right hand edges of the screen of the video monitor is substantially 160°–200°.

11. A teleconferencing robot as claimed in claim 1, wherein the attention getting means comprises a representation of a hand and arm.

12. A teleconferencing robot as claimed in claim 11, wherein a free end of the arm is mechanically coupled to the base, whereby said representation of a hand and arm may be rotated alternatively inwardly and outwardly, to mimic a waving motion.

13. A teleconferencing robot as claimed in claim 3, in combination with a remote teleconferencing unit which comprises a second microphone and a second video camera for obtaining an audio signal and an image from the remote conferee for transmission to the video monitor of the teleconferencing robot, and a second video monitor and a second speaker for providing a video image and an audio signal received from the teleconferencing robot;
   wherein the video monitor of the teleconferencing robot is provided with a speaker for outputting an audio signal received from the microphone of the remote teleconferencing unit; and
   wherein the input control signal is provided by the remote teleconferencing unit.

14. A teleconferencing robot in combination with a remote teleconferencing unit as claimed in claim 13, wherein the remote teleconferencing unit and the teleconferencing robot are each provided with a respective communication controller for audio, video and data signals, for communication therebetween over a transmission system; and
   wherein the communications controllers transmit audio and video signal in both directions between the remote teleconferencing unit and the teleconferencing robot, and data signals to the teleconferencing robot, for controlling the teleconferencing robot and the outgoing data signals back to the remote teleconferencing unit, to provide information on movement of the teleconferencing robot.

15. A teleconferencing robot as claimed in claim 5, further comprising microphone array means for enabling a location of a speaker to be determined and generating a detection signal indicative of the location of the speaker wherein the input control signal is derived from the detection signal and causes the rotating drive unit to rotate the video monitor to a position substantially facing the location of the speaker; and further comprising a switch unit enabling the input control signal to be selectively derived from the detection signal and the remote signal generated by the remote conferee.

16. A teleconferencing robot in combination with a remote teleconferencing unit as claimed in claim 14 wherein the remote teleconferencing unit comprises a graphics overlay unit for generating characters, symbols or icons indicative of the outgoing data signals for display on the second video monitor.

17. A teleconferencing robot in combination with a remote teleconferencing unit as claimed in claim 16 wherein the graphics overlay unit superimposes the characters, symbols or icons indicative of the outgoing data signals on the video image indicative of the video signals received from the teleconferencing robot.

18. A teleconferencing robot as claimed in claim 3, wherein a screen of the video monitor is positioned near the vertical axis about which the video monitor rotates; and wherein the video camera rotates substantially about the vertical axis.

19. A teleconferencing robot as claimed in claim 5, further comprising:

location determining means for enabling a location of a person to be determined and generating a detection signal indicative of the location of the speaker;

wherein the location determining means is fixed to the base such that the video camera and the video monitor rotate independently of the location determining means; and wherein the input control signal is derived from the detection signal and causes the rotating drive unit and pan drive unit to rotate the video monitor and video camera, respectively, to a position substantially facing the location of the speaker.

20. A teleconferencing robot as claimed in claim 1, in combination with a remote teleconferencing unit which comprises a second video monitor and a second speaker for providing video image and an audio signal received from the teleconferencing robot;

wherein the teleconferencing unit receives the outgoing data signal and provides the input control signal; and wherein the remote teleconferencing unit further comprises a graphics overlay unit for generating characters, symbols or icons indicative of the outgoing data signals for display on the second video monitor.

* * * * *